Oct. 22, 1963  J. B. TOMLINSON  3,107,710
PORTABLE PICKLE SLICER
Filed May 20, 1960  2 Sheets-Sheet 1
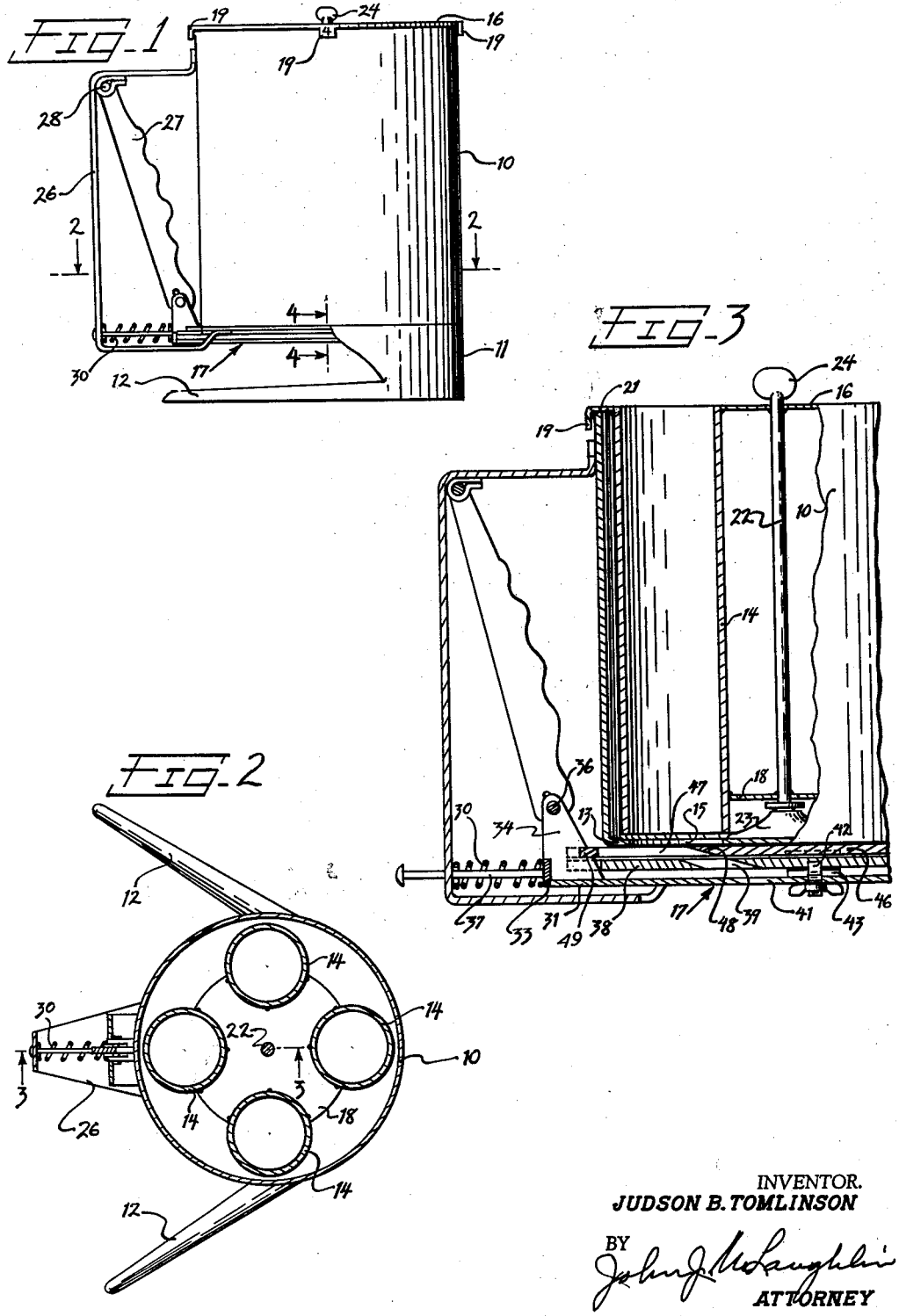
INVENTOR.
JUDSON B. TOMLINSON
BY
ATTORNEY Oct. 22, 1963     J. B. TOMLINSON     3,107,710
PORTABLE PICKLE SLICER
Filed May 20, 1960     2 Sheets-Sheet 2
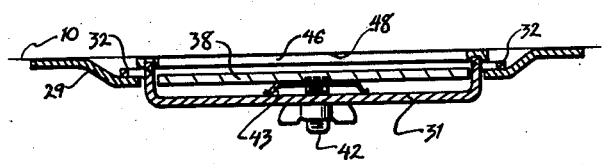
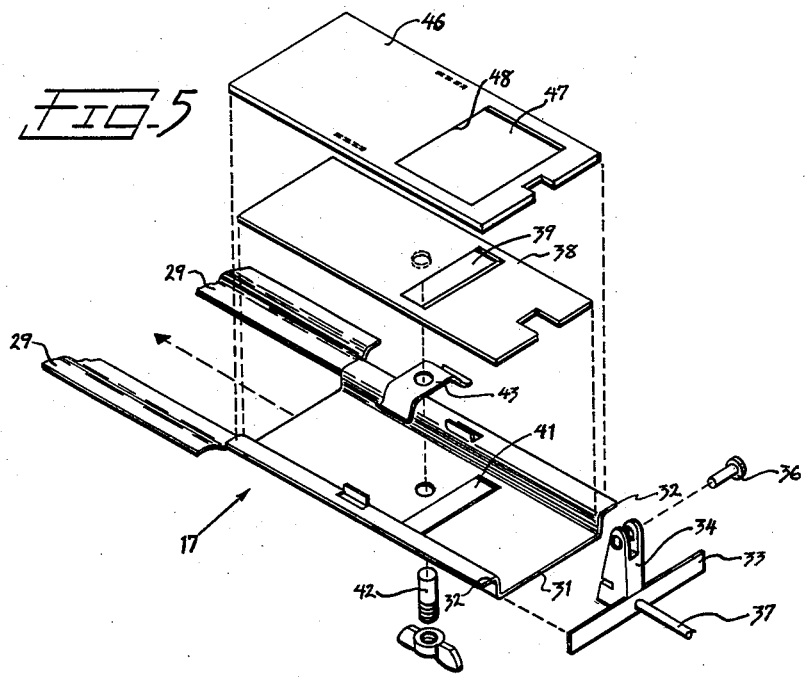
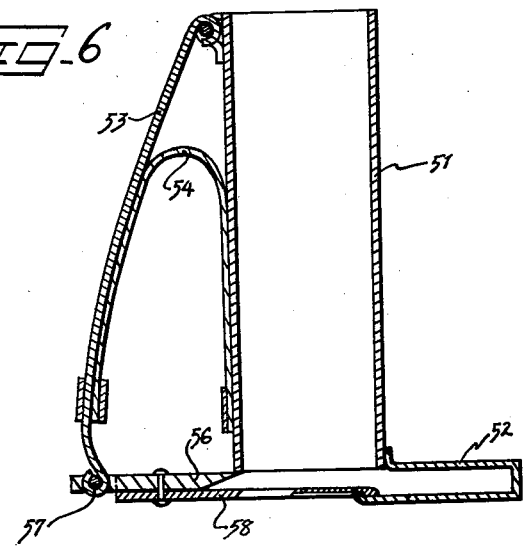
INVENTOR.
JUDSON B. TOMLINSON
BY
ATTORNEY

3,107,710
PORTABLE PICKLE SLICER
Judson B. Tomlinson, Phoenix, Ariz., assignor of one-half to Joseph Tomalczyk, Phoenix, Ariz.
Filed May 20, 1960, Ser. No. 30,618
7 Claims. (Cl. 146—151)

My invention relates to a portable pickle slicer adapted to slice whole pickles and simultaneously dispense or serve them in food establishments.

Pickles of various kinds are normally packed and vended as whole pickles, in longitudinal slices, or in thin transverse slices. The latter are commonly used on many types of sandwiches and sometimes on other dishes in restaurants catering to this type of trade. In dispensing food, it is essential that labor be saved whereever possible, and to this end many labor saving devices and practices have been introduced. Sliced pickles, however, are still taken from the container by hand with consequent added expenditure of time, particularly in restaurants and lunch counters specializing in sandwiches. It is known that most people prefer the flaxor of freshly sliced whole pickles and also that normally the price of whole pickles is relatively lower than sliced pickles. The added labor of hand slicing pickles in the restaurant, however, has made the practice prohibitive, particularly in lower price establishments where sandwiches are the main fair.

The principal object of my invention is the provision of a relatively inexpensive portable pickle slicer particularly adapted for restaurant and lunch counter use.

Another object is to provide a pickle slicer which can be used simultaneously to dispense the slices.

Still another object is to provide a pickle slicer which will accommodate various sizes and types of pickles.

A further object is to provide a pickle slicer in which the thickness of the slice may be controlled.

In the drawings I show two embodiments of my invention, both, however, utilizing the same general features. In such drawings, FIGURE 1 is an elevational view of one embodiment of the invention in which there are a plurality of pickle magazine tubes, each adjustable to pickle cutting position;

FIGURE 2 is a transverse sectional view taken on the line 2—2 of FIGURE 1;

FIGURE 3 is an enlarged fragmentary vertical sectional view taken on the line 3—3 of FIGURE 2;

FIGURE 4 is an enlarged fragmentary sectional view taken on the line 4—4, showing details of the cutting knife assembly;

FIGURE 5 is an enlarged exploded view showing details of the cutting knife assembly, and FIGURE 6 is a vertical sectional view showing a modification in which only a single pickle magazine tube is used.

Referring now first to FIGURES 1 through 4, a cylindrical frame 10 rests on a base 11 which may either be attached to the frame 10 or separate so as merely to form a support for the device to set on when it is not being used. The base 11 has a pair of spreading supporting and balancing legs 12 to leave free and unobstructed the portion of the device where the pickle slice is ejected. A bottom 13 is provided in the cylindrical frame 10 and has an opening 15 (FIGURE 3) through which the pickles drop when they are brought into cutting position. It also reinforces the frame structure and forms a bottom for engagement with the base 11. A plurality of vertical open ended pickle receiving tubes 14 have their upper ends projecting through and attached to, or by welding, a top plate 16 which rests on the top annular edge of the cylindrical frame 10 and thus holds the bottom open ends of tubes 14 in a fixed space relative to the bottom of the frame and the cutter knife assembly indicated generally by the reference character 17. A generally circular support 18 (FIGURES 2 and 3) has a cut out portion for each tube 14, and being secured to the tubes as by welding cooperates with the top plate 16 to hold the tubes 14 in vertically parallel relation. A plurality of projections 19, one for each tube, extend downwardly around the top edge of the cylindrical frame 10 to position the entire assembly comprising the four tubes 14.

In operation, the four tubes 14 are filled with pickles (for example, each containing a single large pickle to be sliced), and successively rotated to slicing position after a tube in slicing position has been emptied by having its contents completely sliced. An indexing detent 21 is provided for engagement by the projections 19 to position the tubes for slicing. An upwardly projecting centrally positioned rod 22 extends through holes in both the plate 16 and support 18 and is welded to each of these members. It also carries a bell shaped base 23 which sets on the bottom 15 of the frame 10. It thus also assists in supporting the assembly comprising the tubes 14 so that only a part of their weight is carried on the top rim of the frame 10. The rod 22 has a top handle 24 which may be used in indexing the assembly to proper pickle cutting position.

The frame 10 has a handle 26 to which an operating lever 27 is pivoted at 28. The entire device may therefore be held in such a way that by squeezing the handle and operating lever, a pickle may have one slice cut therefrom, and by releasing the operating lever the cutting assembly is returned to starting position by action of the spring 30.

The cutting knife assembly is shown in the exploded view (FIGURE 5) and also shows in part in each of FIGURES 1 through 4. A pair of parallel stampings welded to the bottom 13 of frame 10 form a pair of spaced guides 29. A generally channel shaped support 31 has a pair of side projections 32 which ride on top of the guides 29 and support the entire assembly. An end plate 33 welded to the end of the channel shaped support 29 carries an upper projection 34 to which the bottom end of the lever 27 is pivoted by a pin 36. A rod 37 projecting from end plate 33 serves to position the return spring 30.

The channel shaped support 31 acts as a frame for the knife assembly and this knife and all associated parts move as a unit on the guides 29. A base plate 38 rests in the channel support 31 and acts as a support for the pickle when in cutting position. It has an ejection hole 39 generally aligned with a similar ejection hole 41 in the support 31. A vertical stud 42 is carried on the underside of the base plate 38 and extends through holes in a transverse leaf spring 43 and channel support 31. The leaf spring 43 biases the base plate upwardly, but by tightening wing nut the base plate may be moved downwardly against the leaf spring 43.

A knife blade 46 has a pair of bottom grooves 47 which receive a pair of upwardly extending projections from the support member 31. This construction positively positions the knife and prevents it wabbling. The cutting edge 48 of the knife is wedge shaped so as to deflect the pickle slice downwardly through the holes 39 and 41. It will be noted that the knife blade 46 is flush up against the lower surface of bottom 13 of the generally cylindrical frame member 10, particularly in the region of the opening 15. This causes the knife to cut the skin portion of the pickle substantially with a scissors action to assure complete cutting through of the pickle; however, I may provide a stop 49 against which the knife engages in its final cutting position. The stop 49 may be formed of a relatively soft material such as plastic or lead, or it may have a transverse kerf, facing the knife, into which kerf the cutting edge of the knife blade can project to accomplish the final cutting.

FIGURE 6 shows a very simple embodiment of the invention which is inexpensive to make and convenient and simple to use. A single cylindrical tube 51 has a forward integral rectangular projection 52 which acts partly as a base and provides a recess or housing partly enclosing the cutter knife assembly. A handle member 53 has its top end secured to the pickle receiving tube 51 and a spring pressed away from the tube 51 by a leaf spring 54. A cutting knife 56 is slidable supported below the tube 51 and has its outer end pivotally secured to the handle member 53 by a pin 57. A support and guide member 58 moves with the cutting knife 56 and has an opening below the knife edge so that a pickle slice forced downwardly by the wedge shaped cutting edge is caused to drop through the opening for dispensing. As the assembly comprising the cutting knife 56 and support and guide member 58 move forwardly in a pickle slicing direction, they are guided by the projecting housing 52 and extend into the housing at the extreme forward position. While the simplified form of the invention shown in FIGURE 6 does not have an adjustable cutting blade and some of the other refinements disclosed in the first described embodiment, these features may, if desired, be added to a simple cutter comprising a single pickle magazine tube.

The manner of operating the device of my invention is believed obvious from the description thereof. I wish to note, however, that the wide legs 12 make it possible to insert a serving plate under the device of FIGURE 1, so that a pickle slice or slices may be placed on a sandwich or plate quickly and without moving the pickle cutting device. As a tube becomes emptied, the machine may be adjusted to present a full tube to cutting position, and during temporary slack periods, empty tubes may be refilled. Using the FIGURE 6 device, the waiter or cook grasps the entire tube 51 in his hands, with his fingers overlapping the handle 53 which thereby acts as an operating lever. Each time the device is squeezed, a pickle slice is discharged. The tube 52 may be filled as the user moves along, a fresh whole pickle, being introduced on a short piece of pickle at the bottom with not trouble whatsoever.

My device may take various specific forms, and while the two embodiments shown are preferred examples of two extremes of price and capacity, the scope of the invention is defined by the claims.

I claim:

1. A portable pickle slicer and dispenser comprising a vertical tube open at top and bottom of a size to receive a pickle without binding so that the weight of the pickle will bias it in a downward direction, means providing a movable support on which the pickle rests while in said tube, said support having a transverse opening therein, a knife blade having a wedge shaped cutting edge normally spring biased to a position removed from the said tube but with its cutting edge near said transverse opening, said knife being positioned above the said support whereby movement of the knife will cut a slice from the bottom of the pickle the thickness of which is determined by the space between said knife and support, and means responsive to hand squeezing pressure for moving said knife against the bias of its spring to cut a slice from the bottom of the pickle and peel it off in such a way as to cause it to drop through said transverse opening.

2. A pickle slicer and dispenser as defined in claim 1, including means for adjusting the position of said knife to control the thickness of the pickle slice.

3. A pickle slicer and dispenser as defined in claim 1, including means for adjusting the position of said knife to control the thickness of the pickle slice, said adjusting means including a spring biasing said knife upwardly, and screw means operable by a wing nut for drawing the knife downwardly against its said biasing spring.

4. A portable pickle slicer and dispenser comprising a vertical tube open at both ends and adapted to receive a pickle for slicing, a cutting knife assembly supported below said tube including a knife having a wedge shaped cutting edge adapted to peel a cut slice away from a pickle from which it is being sliced and a support and guide member having a surface on which a pickle in the tube rests and an opening below the knife cutting edge through which the slice may fall, actuating handle member with an upper end pivoted to the tube and a lower end pivoted to the cutting knife assembly, and spring means biased to hold the cutting knife assembly in a retracted position, whereby the tube and actuating handle member may be squeezed with one hand to cut a slice from the bottom of the pickle lodged in said tube.

5. A portable pickle slicer and dispenser comprising a generally cylindrical frame, a magazine assembly having a plurality of upright pickle receiving tubes, open at both ends, said frame having a closed bottom with a single opening at pickle cutting position whereby said tubes may be filled with pickles and successively indexed to pickle cutting position, a cutting knife assembly reciprocally supported below the frame, spring means normally retracting said cutting knife assembly, and means for moving said cutting knife assembly forwardly to remove a single slice from the bottom of the pickle in cutting position.

6. A portable pickle slicer and dispenser comprising a generally cylindrical frame, a magazine assembly having a plurality of upright pickle receiving tubes, open at both ends, said frame having a closed bottom with a single opening at pickle cutting position whereby said tubes may be filled with pickles and successively indexed to pickle cutting position, a cutting knife assembly reciprocally supported below the frame, spring means normally retracting said cutting knife assembly, and means for moving said cutting knife assembly forwardly to remove a single slice from the bottom of the pickle in cutting position, said cutting knife assembly including a cutting knife with a wedge shaped cutting edge to peel a slice from the pickle from which it is cut, and a support member moving with the knife having a position for supporting the pickle when the cutting knife assembly is fully retracted by the spring, and an opening below the cutting knife edge for discharge of a fully excised slice.

7. A portable pickle slicer and dispenser comprising a generally cylindrical frame, a magazine assembly having a plurality of upright pickle receiving tubes, open at both ends, said frame having a closed bottom with a single opening at pickle cutting position whereby said tubes may be filled with pickles and successively indexed to pickle cutting position, a cutting knife assembly reciprocally supported below the frame, spring means normaly retracting said cutting knife assembly, and means for moving said cutting knife assembly forwardly to remove a single slice from the bottom of the pickle in cutting position, said cutting knife assembly including a cutting knife with a wedge shaped cutting edge to peel a slice from the pickle from which it is cut, a support member moving with the knife having a position for supporting the pickle when the cutting knife assembly is fully retracted by the spring, and an opening below the cutting knife edge for discharge of a fully excised slice, and means for adjusting the relative vertical distance between the knife and support member to control the thickness of the slice.

References Cited in the file of this patent

UNITED STATES PATENTS

| | | |
|---|---|---|
| 1,002,150 | Henriques | Aug. 29, 1911 |
| 1,265,833 | Tucker | May 14, 1918 |
| 1,412,883 | Maddux | Apr. 18, 1922 |
| 2,166,648 | Swofford | July 18, 1939 |
| 2,173,988 | Vernick | Sept. 28, 1939 |
| 2,245,803 | McWhirter | June 17, 1941 |
| 2,545,557 | Ransom | Mar. 20, 1951 |
| 2,661,039 | Davis et al. | Dec. 1, 1953 |
| 2,699,273 | Self | Jan. 11, 1955 |
| 2,815,153 | McCarthy | Dec. 3, 1957 |

FOREIGN PATENTS

| | | |
|---|---|---|
| 478,067 | Canada | Oct. 30, 1951 |